(12) United States Patent
Kim et al.

(10) Patent No.: US 11,276,917 B2
(45) Date of Patent: Mar. 15, 2022

(54) FILM ANTENNA AND DISPLAY DEVICE INCLUDING THE SAME

(71) Applicants: DONGWOO FINE-CHEM CO., LTD., Jeollabuk-do (KR); KREEMO INC., Seoul (KR)

(72) Inventors: Jong Min Kim, Gyeonggi-do (KR); Han Sub Ryu, Gyeongsangbuk-do (KR); Yoon Ho Huh, Seoul (KR); Won Bin Hong, Seoul (KR)

(73) Assignees: DONGWOO FINE-CHEM CO., LTD., Jeollabuk-Do (KR); KREEMO INC., Seoul (KR)

( * ) Notice: Subject to any disclaimer, the term of this patent is extended or adjusted under 35 U.S.C. 154(b) by 0 days.

(21) Appl. No.: 16/861,560

(22) Filed: Apr. 29, 2020

(65) Prior Publication Data
US 2020/0259246 A1   Aug. 13, 2020

Related U.S. Application Data

(63) Continuation of application No. PCT/KR2018/013338, filed on Nov. 6, 2018.

(30) Foreign Application Priority Data

Nov. 6, 2017 (KR) .................. 10-2017-0146687

(51) Int. Cl.
*H01Q 1/24* (2006.01)
*H01Q 1/48* (2006.01)
(Continued)

(52) U.S. Cl.
CPC .............. *H01Q 1/243* (2013.01); *H01Q 1/48* (2013.01); *H01Q 9/0407* (2013.01); *H04M 1/0266* (2013.01)

(58) Field of Classification Search
None
See application file for complete search history.

(56) References Cited

U.S. PATENT DOCUMENTS

| | | | |
|---|---|---|---|
| 6,445,347 B1 * | 9/2002 | Yoshimi | H01Q 1/243 343/702 |
| 2008/0150815 A1 * | 6/2008 | Nakahata | H01Q 1/243 343/718 |

(Continued)

FOREIGN PATENT DOCUMENTS

| | | |
|---|---|---|
| CN | 2671143 Y | 1/2005 |
| CN | 102422486 A | 4/2012 |

(Continued)

OTHER PUBLICATIONS

Office action dated Jun. 1, 2021 from Japan Intellectual Property Office in a counterpart Japanese Patent Application No. 2020-524646. (English translation is also submitted herewith.).

(Continued)

*Primary Examiner* — Crystal L Hammond
(74) *Attorney, Agent, or Firm* — The PL Law Group, PLLC (57) ABSTRACT

A film antenna according to an embodiment of the present invention includes a dielectric layer, a pad disposed on the dielectric layer and an antenna pattern inclined with respect to the pad on the dielectric layer. A generation of a side lobe is prevented by the inclined orientation of the antenna pattern. A radiation in a –Z-axis direction may be suppressed to enhance a signal intensity of a radiation pattern and prevent a signal loss. A display device including the film antenna is also provided.

12 Claims, 6 Drawing Sheets

(51) Int. Cl.
*H01Q 9/04* (2006.01)
*H04M 1/02* (2006.01)

(56) References Cited

U.S. PATENT DOCUMENTS

| | | | |
|---|---|---|---|
| 2008/0252425 A1* | 10/2008 | Okegawa | G06K 19/07749 340/10.1 |
| 2009/0122847 A1* | 5/2009 | Nysen | H01Q 1/2275 375/222 |
| 2014/0078005 A1 | 3/2014 | Park et al. | |
| 2016/0079674 A1 | 3/2016 | Okunaga et al. | |
| 2018/0358706 A1* | 12/2018 | Kildal | H01Q 9/28 |

FOREIGN PATENT DOCUMENTS

| | | |
|---|---|---|
| CN | 104681993 A | 6/2015 |
| EP | 1 367 671 A2 | 12/2003 |
| JP | 10-126146 A | 5/1998 |
| JP | 2000-138512 A | 5/2000 |
| JP | 2003-347827 A | 12/2003 |
| JP | 2007-251625 A | 9/2007 |
| JP | 2008-219322 A | 9/2008 |
| JP | 2012-105072 A | 5/2012 |
| JP | 2016-063321 A | 4/2016 |
| JP | 2017-175540 A | 9/2017 |
| KR | 10-2003-0095557 A | 12/2003 |
| KR | 10-2012-0130612 A | 12/2012 |
| KR | 10-2016-0027446 A | 3/2016 |
| KR | 10-1776850 B1 | 9/2017 |

OTHER PUBLICATIONS

International Search Report for PCT/KR2018/013338 dated Mar. 5, 2019.
Notice of Allowance dated Oct. 5, 2021 from Japan Patent Office in a counterpart Japanese Patent Application No. 2020-524646. (English translation is also submitted herewith.).

* cited by examiner

FIG. 1

2nd direction
1st direction

FILM ANTENNA AND DISPLAY DEVICE INCLUDING THE SAME

CROSS REFERENCE TO RELATED APPLICATIONS AND CLAIM OF PRIORITY

The present application is a continuation application to International Application No. PCT/KR2018/013338 with an International Filing Date of Nov. 6, 2018, which claims the benefit of Korean Patent Application No. 10-2017-0146687 filed on Nov. 6, 2017 at the Korean Intellectual Property Office, the disclosures of which are incorporated by reference herein in their entirety.

BACKGROUND

1. Field

The present invention relates to a film antenna and a display device including the same. More particularly, the present invention relates to a film antenna including an electrode and a dielectric layer and a display device including the same.

2. Description of the Related Art

As information technologies have been developed, a wireless communication technology such as Wi-Fi, Bluetooth, etc., is combined with a display device in, e.g., a smartphone form. In this case, an antenna may be combined with the display device to provide a communication function.

As mobile communication technologies have been developed recently, an antenna for a communication of a high-frequency or ultra-high frequency band is required in the display device. Further, as the display device having a compact size has been developed, a distance or a space between the antenna and a display panel of the display device becomes decreased. Accordingly, the antenna may be substantially integral with the display device.

In this case, an operation of the display device or structures in the display panel (e.g., a thin film transistor, a light emitting element, etc.) may be disturbed by a radio-wave or a radiation from the antenna.

Thus, proper control of the radiation or the radio-wave direction from the antenna for enhancing signaling sensitivity without affecting an image quality may be needed.

SUMMARY

According to an aspect of the present invention, there is provided a film antenna having improved signaling efficiency and radiation reliability.

According to an aspect of the present invention, there is provided a display device including a film antenna with improved signaling efficiency and radiation reliability.

The above aspects of the present invention will be achieved by one or more of the following features or constructions:

(1) A film antenna, including: a dielectric layer; a pad disposed on the dielectric layer; and an antenna pattern inclined with respect to the pad on the dielectric layer.

(2) The film antenna according to the above (1), wherein the antenna pattern includes a radiation pattern and a transmission line mediating the radiation pattern and the pad.

(3) The film antenna according to the above (2), wherein the radiation pattern and the transmission line are inclined with respect to the pad.

(4) The film antenna according to the above (3), wherein the radiation pattern and the transmission line extend with the same inclination angle.

(5) The film antenna according to the above (3), wherein inclination angles of the radiation pattern and the transmission line with respect to the pad are different from each other.

(6) The film antenna according to the above (1), wherein the antenna pattern includes antenna patterns which are inclined in opposite directions with respect to the pad.

(7) The film antenna according to the above (1), further including a parallel antenna pattern that extends to be parallel with respect to the pad.

(8) The film antenna according to the above (1), wherein the antenna pattern is inclined by a predetermined inclination angle with respect to a sidewall of the pad.

(9) The film antenna according to the above (8), wherein the inclination angle is 5 degree (°) or more, and less than 90°.

(10) The film antenna according to the above (1), further including a ground layer under the dielectric layer.

(11) The film antenna according to the above (1), further including a dummy pattern formed around the antenna pattern.

(12) The film antenna according to the above (11), wherein the antenna pattern and the dummy pattern include a mesh structure.

(13) A display device including the film antenna according to embodiments as described above.

In the film antenna according to embodiments of the present invention, a radiation pattern and a transmission line may be inclined with respect to a pad. Accordingly, a radiation in, e.g., a −Z-axis direction may be suppressed to enhance a signal intensity of the radiation pattern and prevent a signal loss.

Further, when the film antenna is employed to a display device, malfunction or image disturbance of the display device due to the radiation in the −Z-axis direction may be also prevented.

The film antenna may be applied to a display device including a mobile communication device capable of transmitting/receiving at high-frequency or ultra-high frequency bands of 3G, 4G, 5G or more to also improve radiation properties and image quality.

DETAILED DESCRIPTION OF THE EMBODIMENTS

According to exemplary embodiments of the present invention, there is provided a film antenna including a radiation pattern extending diagonally relative to a pad by a predetermined angle so that a generation of a side lobe may be suppressed and a signaling reliability may be improved, The film antenna may be, e.g., a microstrip patch antenna fabricated as a transparent film. The film antenna may be applied to a communication device for high or ultra-high frequency band (e.g., 3G, 4G, 5G or more) mobile communications.

According to exemplary embodiments of the present invention, there is provided a display device including the film antenna. The film antenna may be also applied to various devices or objects such as an automobile, a home electronic device, an architecture, etc.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
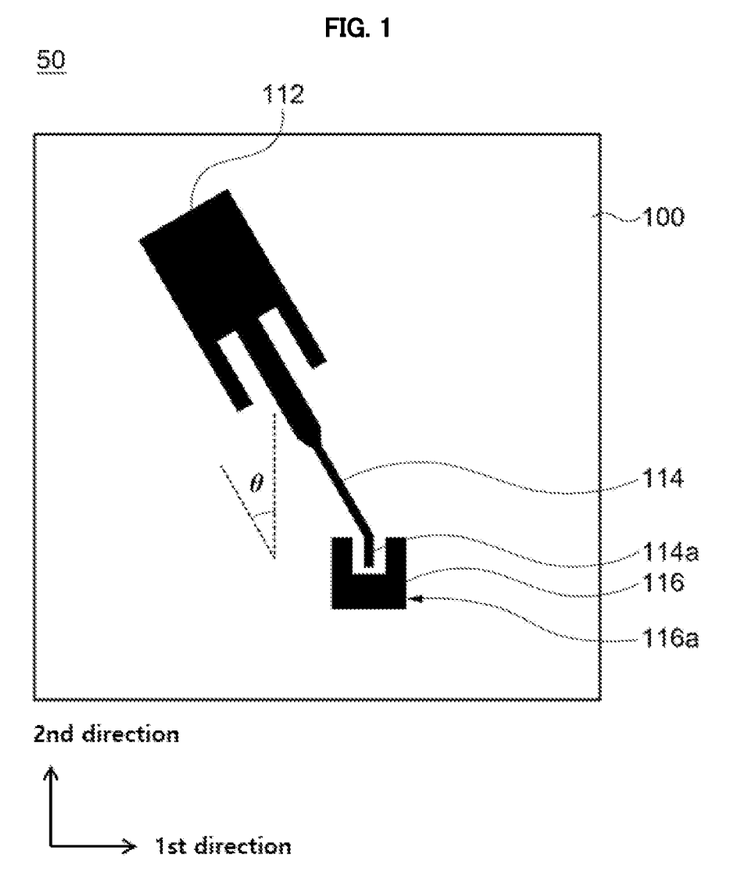
FIGS. 1 and 2 are a schematic top planar view and a schematic cross-sectional view, respectively, illustrating a film antenna in accordance with exemplary embodiments.
Figure 2:
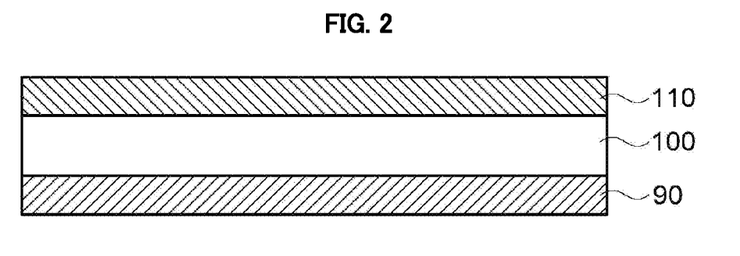

FIGS. 1 and 2 are a schematic top planar view and a schematic cross-sectional view, respectively, illustrating a film antenna in accordance with exemplary embodiments.

The film antenna 50 may include sides extending in a first direction and a second direction. For example, the first direction and the second direction may be perpendicular on the same plane. The first direction may be a horizontal direction (or a width direction), and the second direction may be a vertical direction (or a length direction).

Referring to FIGS. 1 and 2, the film antenna 50 may include an antenna pattern and a pad 116 disposed on a dielectric layer 100

The dielectric layer 100 may serve as a film substrate of the film antenna 50 for forming the antenna pattern. The dielectric layer 100 may include an insulating material having a predetermined dielectric constant. The dielectric layer 100 may include, e.g., an inorganic insulating material such as glass, silicon oxide, silicon nitride and a metal oxide, etc.

The dielectric layer 100 may include a transparent resin material. For example, the dielectric layer 100 may include, e.g., a polyester-based resin such as polyethylene terephthalate, polyethylene isophthalate, polyethylene naphthalate, polybutylene terephthalate, etc.; a cellulose-based resin such as diacetyl cellulose, triacetyl cellulose, etc.; a polycarbonate-based resin; an acryl-based resin such as polymethyl (meth)acrylate, polyethyl (meth)acrylate, etc.; a styrene-based resin such as polystyrene, an acrylonitrile-styrene copolymer; a polyolefin-based resin such as polyethylene, polypropylene, a polyolefin having a cyclo or norbornene structure, etc.; a vinyl chloride-based resin; an amide-based resin such as nylon, an aromatic polyamide, etc.; an imide-based resin; a polyether sulfone-based resin; a sulfone-based resin; a polyether ketone-based resin; a polyphenylene sulfide-based resin; a vinyl alcohol-based resin; a vinylidene chloride-based resin; a vinyl butyral-based resin; an allylate-based resin; a polyoxymethylene-based resin; an epoxy-based resin; a urethane or acryl urethane-based resin; a silicone-based resin, etc. These may be used alone or in a combination thereof.

In some embodiments, the dielectric layer 100 may include an adhesive film including a pressure-sensitive adhesive (PSA) or an optically clear adhesive (OCA).

In some embodiments, a dielectric constant of the dielectric layer 100 may be in a range from about 1.5 to about 12. If the dielectric constant exceeds about 12, a driving frequency may be excessively decreased and a desired high-frequency radiation may not be implemented.

The antenna pattern may include a radiation pattern 112 and a transmission line 114.

The radiation pattern 112 may be integrally connected to the transmission line 114. For example, the radiation pattern 112 may include a protrusion connected to the transmission line 114 in a central portion thereof.

The transmission line 114 may be provided as a feeding line of the antenna pattern, for example. The transmission line 114 may extend from the protrusion of the radiation pattern 112 to the pad 116.

As illustrated in FIG. 1, the pad 116 may include a recess therein, and the transmission line 114 may be inserted into the recess of the pad 116.

However, the shapes of the radiation pattern 112 and the pad 116 may be properly modified from the example of FIG. 1 in consideration of a radiation efficiency, etc.

In exemplary embodiments, the antenna pattern may extend to be diagonal with respect to the pad 116 by a predetermined angle.

For example, the radiation pattern 112 of the antenna pattern may be inclined with respect to the pad 116. An inclination angle θ of the radiation pattern 112 may be defined as an angle between an extension direction of the radiation pattern 112 and the second direction (e.g., a length direction) of the film antenna 50. The inclination angle θ of the radiation pattern 112 may also be defined as an angle between the extension direction of the radiation pattern 112 and a lateral side 116a of the pad 116.

In some embodiments, the transmission line 114 may also be inclined with respect to the pad 116 together with the radiation pattern 112. In an embodiment, the inclination angle of the transmission line 114 and the inclination angle of the radiation pattern 112 may be substantially the same.

In some embodiments, the transmission line 114 may include an end portion 114a, and the end portion 114a may be inserted into the recess of the pad 116. The end portion 114a may be substantially parallel to a length direction of the pad 116 (e.g., the second direction). In this case, the transmission line 114 except for the end portion 114a may be inclined As illustrated in FIG. 2, a first conductive layer 110 may be disposed on the dielectric layer 100, and the first conductive layer 110 may include the antenna pattern and the pad portion 116 as described above.

The antenna pattern and/or the pad 116 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), molybdenum (Mo), calcium (Ca) or an alloy thereof. These may be used alone or in combination thereof. For example, the antenna pattern may be formed of silver (Ag) or a silver alloy (e.g., silver-palladium-copper (APC) alloy), or copper or a copper alloy (e.g., a copper-calcium (CuCa) alloy) for implementing a low resistance and a fine line width.

The antenna pattern and/or the pad 116 may include a transparent metal oxide such as indium tin oxide (ITO), indium zinc oxide (IZO), indium zinc tin oxide (IZTO), zinc oxide (ZnOx), etc.

For example, the antenna pattern and/or the pad 116 may have a multi-layered structure including a metal layer or alloy layer and a transparent metal oxide layer.

A second conductive layer 90 may be disposed under the dielectric layer 100. In exemplary embodiments, the second conductive layer 90 may serve as a ground layer of the film antenna. In this case, a contact or connection ground pattern connecting the second conductive layer 90 and the pad 116 may be formed in the dielectric layer 100.

In some embodiments, the second conductive layer 90 may be included as an individual element of the film antenna. In some embodiments, a conductive member of a display device to which the film antenna is applied may serve as the ground layer.

The conductive member may include a gate electrode of a thin film transistor (TFT), various wirings such as a scan line or a data line, various electrodes such as a pixel electrode, a common electrode, etc., included in a display panel.

The second conductive layer 90 may include a conductive material such as a metal, an alloy or a transparent metal oxide.

According to the exemplary embodiments described above, the antenna pattern may be inclined with respect to the pad 116 so that a side lobe of the film antenna 50 may be prevented or reduced.

For example, when the film antenna 50 is stacked or inserted on a display panel such as an OLED panel or an LCD panel, a radio-wave or a radiation toward the display panel (e.g., in a −Z axis direction) other than a radiation in a desired vertical direction (e.g., +Z axis direction) may occur as the side lobe.

In this case, light-emitting properties of the thin film transistor (TFT) and the OLED layer included in the display panel may be transformed or disturbed due to the −Z axis direction side lobe. Further, an orientation of liquid crystal molecules in a liquid crystal layer may be transformed or disturbed.

However, according to exemplary embodiments, the generation of the radiation or radio wave in the −Z axis direction may be reduced by adjusting the orientation of the antenna pattern to be inclined with respect to the pad 116. Accordingly, operation disturbance of the display panel may be prevented while only achieving desired radiation properties of the film antenna 50.

In some embodiments, as described above, the second conductive layer 90 may be disposed under the dielectric layer 100, and may serve as a ground layer. For example, the inclination angle θ may be formed in the antenna pattern so that a resistance between the antenna pattern and the second conductive layer 90 may be increased, and thus the side lobe generated in the direction of the second conductive layer 90 (e.g., the −Z axis direction) may be suppressed.

The inclination angle θ may be greater than 0 degree (°) and less than 90°. To effectively suppress the radiation in the −Z axis direction, the inclination angle θ of the antenna pattern may be adjusted to 5° or more.

For example, as the inclination angle increases, a degree of the side lobe may be decreased and a beam width of the film antenna 50 may decrease. Thus, a wavelength a selectivity or a gain amount of the film antenna 50 may be increased.

The inclination angle used herein represents an absolute value, and may include angles in a clockwise direction or a counterclockwise direction. For example, in FIG. 1, the antenna pattern may form the inclination angle to a right direction with respect to the pad 116 or the end portion 114*a* of the transmission line 114.

In FIG. 1, only one antenna pattern is illustrated for convenience of descriptions, but a plurality of antenna patterns may be arranged on the dielectric layer 100.

Figure 3:
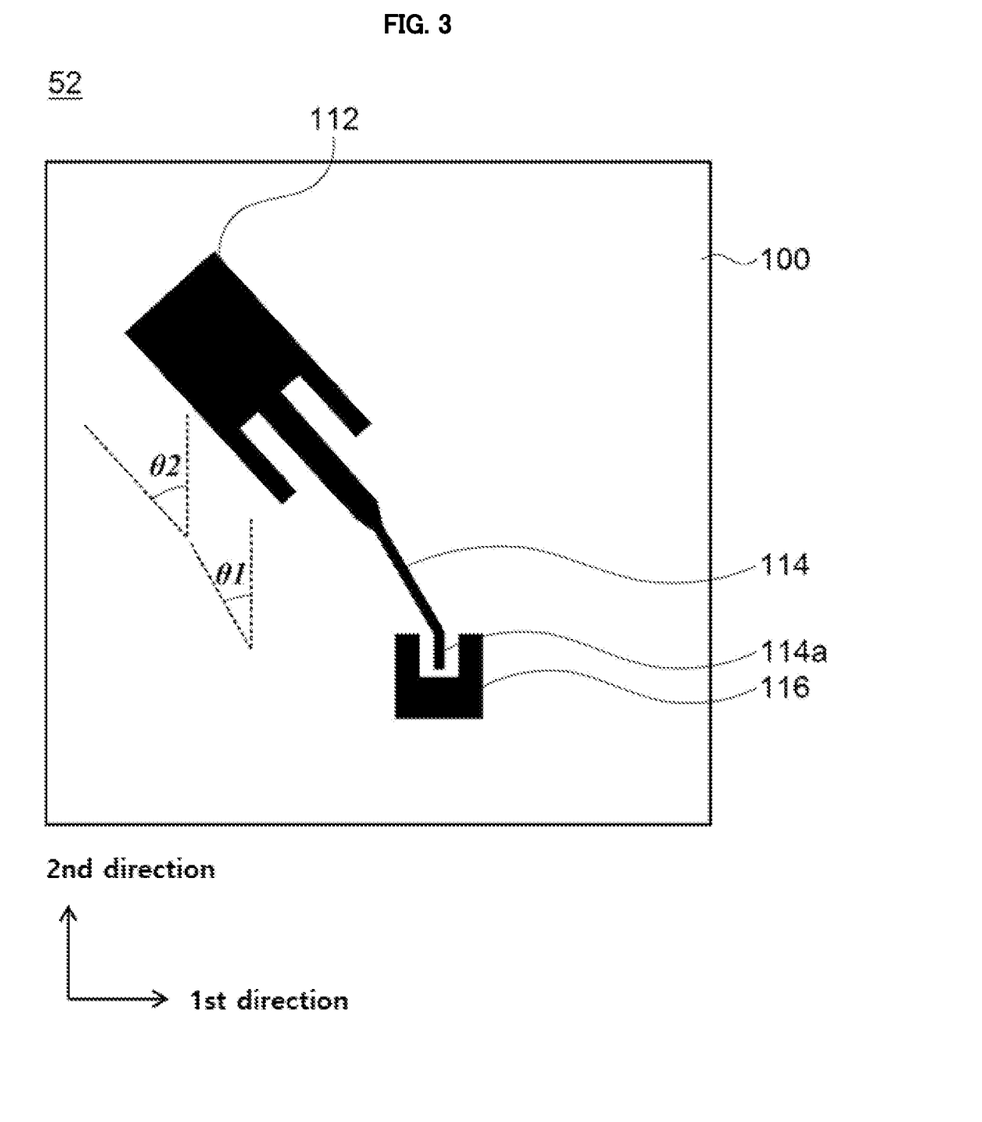
FIG. 3 is a schematic top planar view illustrating a film antenna in accordance with some exemplary embodiments.

FIG. 3 is a schematic top planar view illustrating a film antenna in accordance with some exemplary embodiments.

Referring to FIG. 3, inclination angles of the radiation pattern 112 and the transmission line 114 included in the film antenna 52 may be different.

For example, the transmission line 114 may have a first inclination angle $θ_1$, and the radiation pattern 112 may have a second inclination angle $θ_2$. In some embodiments, the second inclination angle $θ_2$ of the radiation pattern 112 may be greater than the first inclination angle $θ_1$ of the transmission line 114.

The inclination angle of the transmission line 114 may be adjusted to be smaller than the inclination angle of the radiation pattern 112, so that a distance between the radiation pattern 112 and the pad portion 116 may be maintained while blocking the above-mentioned side lobe in the Z-axis direction. For example, the transmission line 114 may function as an intermediate pattern or a buffer pattern between the radiation pattern 112 and the pad 116.

Figure 4:
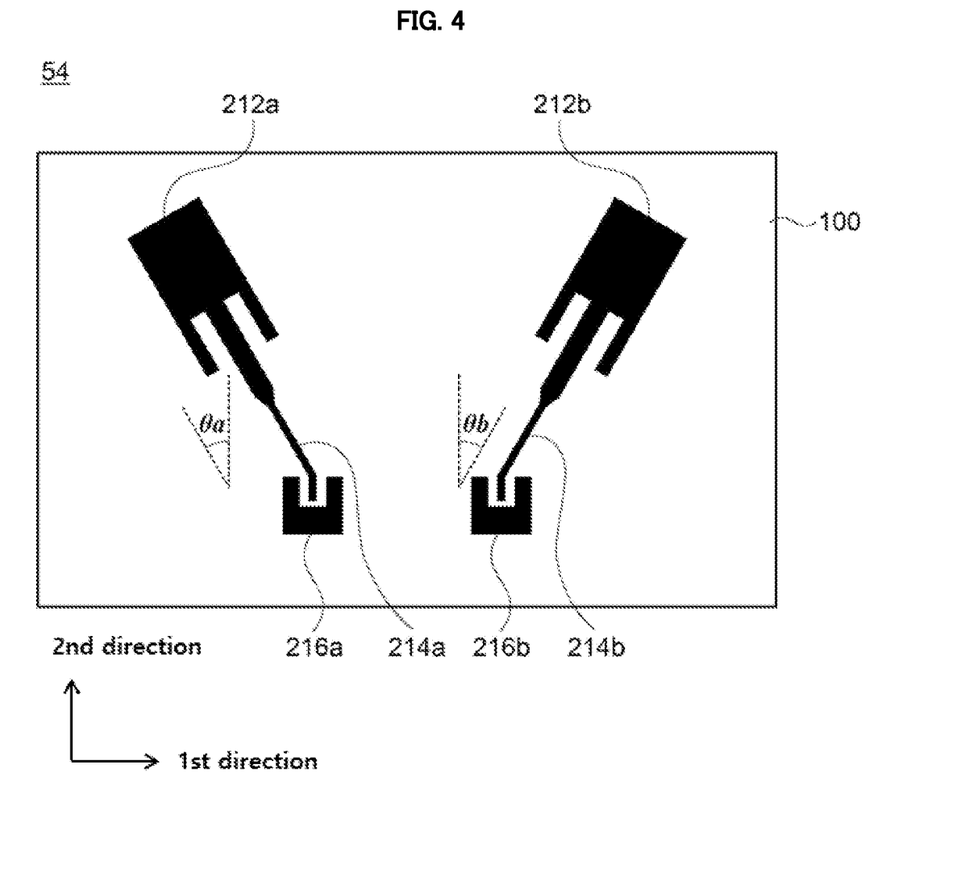
FIG. 4 is a schematic top planar view illustrating a film antenna in accordance with some exemplary embodiments.

FIG. 4 is a schematic top planar view illustrating a film antenna in accordance with some exemplary embodiments.

Referring to FIG. 4, a film antenna 54 may include a plurality of the antenna patterns disposed on the dielectric layer 100, and may include antenna patterns inclined in opposite directions to each other.

For example, the film antenna 54 may include a first antenna pattern and a second antenna pattern inclined in opposite directions to each other. The first antenna pattern may include a first radiation pattern 212*a* and a first transmission line 214*a*, and the second antenna pattern may include a second radiation pattern 212*b* and a second transmission line 214*b*.

As illustrated in FIG. 4, the first antenna pattern and the second antenna pattern may form inclination angles in opposite directions relative to the pads 216*a* and 216*b*.

For example, the first antenna pattern including the first radiation pattern 212*a* and the first transmission line 214*a* may be inclined in a counterclockwise direction (e.g., leftward) relative to the first pad 216*a*. The second antenna pattern including the second radiation pattern 212*b* and the second transmission line 214*b* may be inclined in a clockwise direction (e.g., rightward) with respect to the second pad 216*b*.

The absolute values of the inclination angle θa of the first antenna pattern and the inclination angle θb of the second antenna pattern may be substantially the same as or different from each other.

As described above, a plurality of antenna patterns oriented by different inclination angles may be included so that the anti-side lobe effect may be more uniformly implemented throughout an entire region of the film antenna 54.

Figure 5:
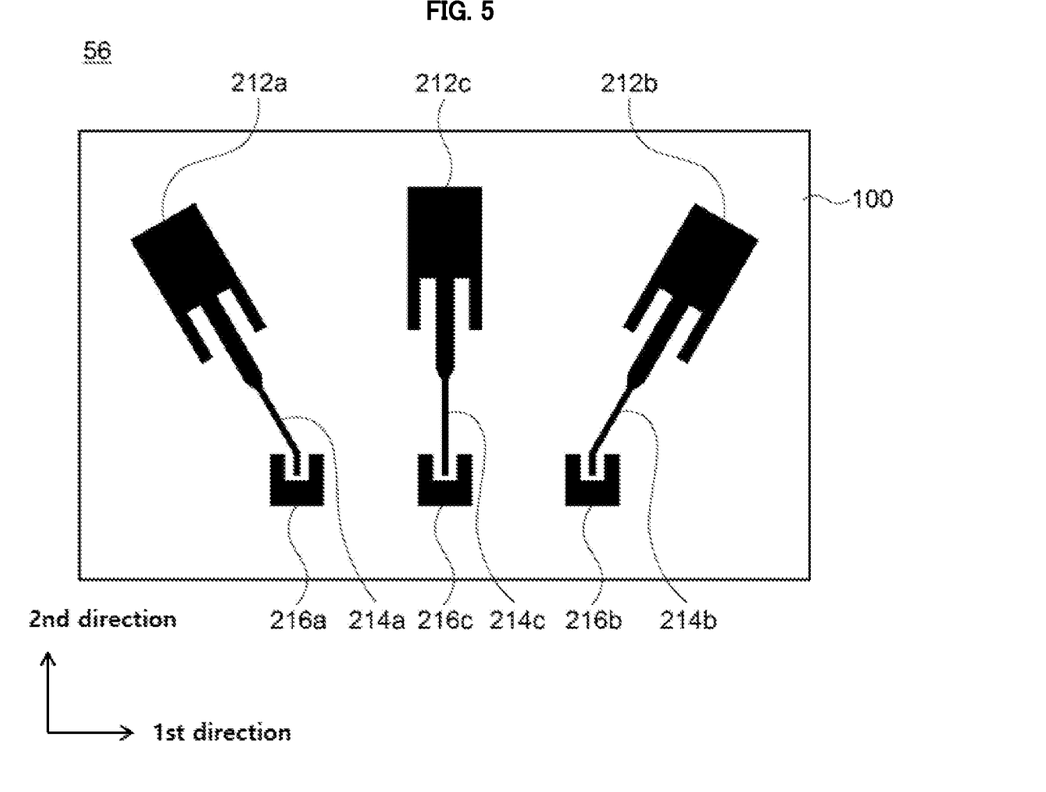
FIG. 5 is a schematic top planar view illustrating a film antenna in accordance with some exemplary embodiments.

FIG. 5 is a schematic top planar view illustrating a film antenna in accordance with some exemplary embodiments.

Referring to FIG. 5, a film antenna 56 may include a plurality of antenna patterns. In some embodiments, the plurality of antenna patterns may include an antenna pattern inclined to a pad and an antenna pattern parallel to a pad.

For example, the antenna pattern may include first to third antenna patterns. The first antenna pattern may include a first radiation pattern 212*a* and a first transmission line 214*a*, and the second antenna pattern may include a second radiation pattern 212*b* and a second transmission line 214*b*. The third antenna pattern may include a third radiation pattern 212*c* and a second transmission line 214*c*.

The first and second antenna patterns may each be inclined by a predetermined angle with respect to a first pad 216*a* and a second pad 216*b*, respectively. For example, as described with reference to FIG. 4, the first and second antenna patterns may be oriented to be inclined in opposite directions.

The third antenna pattern may extend to be substantially parallel to a sidewall of the third pad 216c (e.g., an inclination angle is not formed). For example, the third antenna pattern may extend in the second direction.

In an embodiment, as illustrated in FIG. 5, the first and second antenna patterns may be arranged around the third antenna pattern. For example, the third antenna pattern may be included to enhance radiation in the +Z axis direction, and the generation of side lobes in the −Z axis direction may be suppressed by the first and second antenna patterns.

Figure 6:
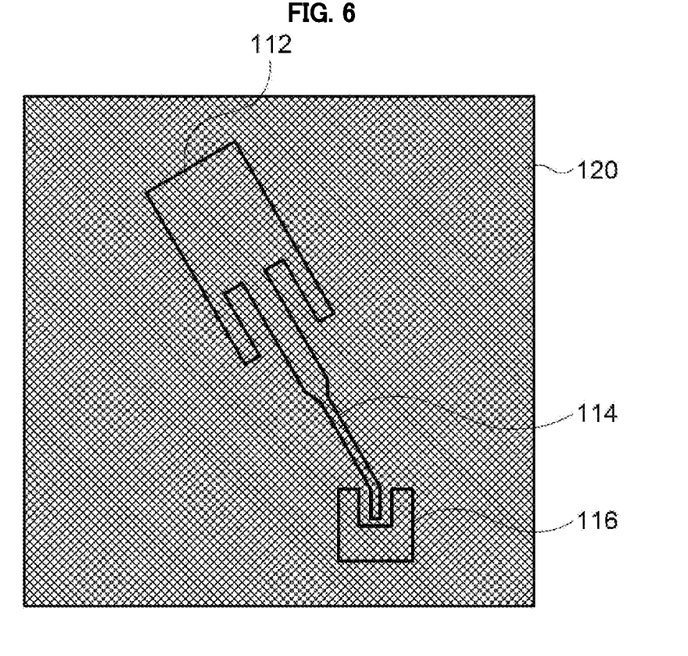
FIGS. 6 and 7 are schematic top planar views illustrating film antennas in accordance with some exemplary embodiments.
Figure 7:
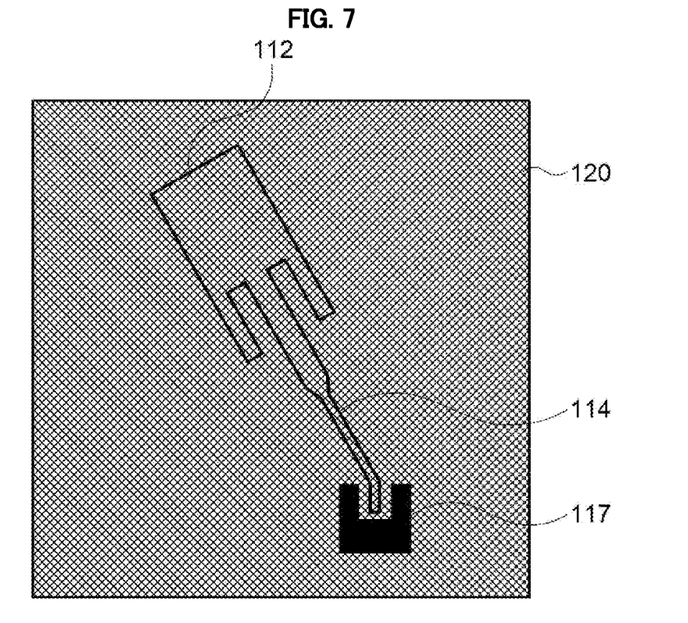

FIGS. 6 and 7 are schematic top planar views illustrating film antennas in accordance with some exemplary embodiments.

Referring to FIGS. 6 and 7, an antenna pattern including the radiation pattern 112 and the transmission line 114 may include a mesh structure. In some embodiments, a dummy pattern 120 may be arranged around the antenna pattern, and the dummy pattern 120 may also include a mesh structure substantially the same as or similar to that of the antenna pattern.

The antenna pattern may be formed of the mesh structure so that a transmittance of the film antenna may be enhanced. Further, the dummy pattern 120 of the mesh structure may be added to prevent a visual recognition of the antenna pattern due to a pattern shape deviation.

Although not explicitly illustrated in FIGS. 6 and 7, a cut region or a separation region from which the mesh structure is cut may be formed between the antenna pattern and the dummy pattern 120 to define the antenna pattern.

As illustrated in FIG. 6, the pad 116 may also be formed of a mesh structure.

In some embodiments, as illustrated in FIG. 7, a pad 117 may have a substantially solid structure (not a mesh structure). In this case, the radiation pattern 112 may be formed of the mesh structure to improve transmittance and optical properties, and the pad 117 may be formed as the solid structure to implement signal sensitivity and low resistance.

For example, the pad 117 may be disposed at a peripheral portion or a bezel portion of the display device, and may not substantially affect a display image.

In some embodiments, the pad 117 may be disposed at a different level or on a different layer from that of the radiation pattern 112. For example, an insulation layer (not illustrated) may be formed on the radiation pattern 112 and the transmission line 114, and the pad 117 may be disposed on the insulation layer.

A contact (not illustrated) for electrically connecting the pad 117 and the transmission line 114 may be formed in the insulation layer.

Figure 8:
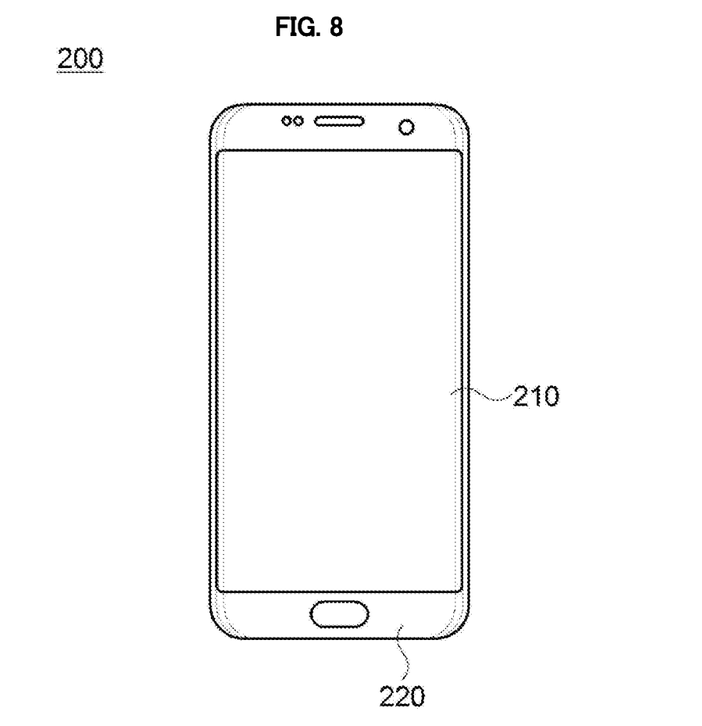
FIG. 8 is a schematic top planar view illustrating a display device in accordance with exemplary embodiments.

FIG. 8 is a schematic top planar view illustrating a display device in accordance with exemplary embodiments.

Referring to FIG. 8, a display device 200 may include a display region 210 and a peripheral region 220. The peripheral region 220 may be positioned, e.g., at both lateral portions and/or both end portions of the display region 210.

In some embodiments, the above-described film antenna may be inserted in the display device 200 as a patch. In some embodiments, the antenna pattern of the film antenna may be entirely covered by the display region 210 of the display device 200. In some embodiments, the radiation pattern 112 (see FIG. 1) of the antenna pattern may be superimposed by the display region 210, and the pad 116 (see FIG. 1) may be disposed to correspond to the peripheral region 220.

The peripheral region 220 may correspond to, e.g., a light-shielding portion or a bezel portion of the image display device. Additionally, a driving circuit such as an IC chip of the display device 200 and/or the film antenna may be disposed in the peripheral region 220.

The pad 116 of the film antenna may be positioned to be adjacent to the driving circuit so that signal transmission/reception path may become shorter to suppress signal loss.

As described above, the antenna pattern including the radiation pattern 112 may have an inclined orientation so that a radiation in the −Z axis direction in the display region 210 may be suppressed. Therefore, radiation properties of high reliability may be realized without degrading an image quality of the display device 200.

What is claimed is:

1. A film antenna, comprising:
    a dielectric layer;
    a pad disposed on the dielectric layer; and
    an antenna pattern formed on the dielectric layer and inclined with respect to the pad, the antenna pattern including a metal or a transparent metal oxide,
    wherein the antenna pattern comprises a radiation pattern physically spaced apart from the pad, and a transmission line mediating the radiation pattern and the pad.

2. The film antenna according to claim 1, wherein the radiation pattern and the transmission line are inclined with respect to the pad.

3. The film antenna according to claim 2, wherein the radiation pattern and the transmission line extend with the same inclination angle.

4. The film antenna according to claim 2, wherein inclination angles of the radiation pattern and the transmission line with respect to the pad are different from each other.

5. The film antenna according to claim 1, wherein the antenna pattern comprises antenna patterns which are inclined in opposite directions to each other with respect to the pad.

6. The film antenna according to claim 1, further comprising a parallel antenna pattern that extends to be parallel with respect to the pad.

7. The film antenna according to claim 1, wherein the antenna pattern is inclined by a predetermined inclination angle with respect to a sidewall of the pad.

8. The film antenna according to claim 7, wherein the inclination angle is 5 degree(°) or more, and less than 90°.

9. The film antenna according to claim 1, further comprising a ground layer under the dielectric layer.

10. The film antenna according to claim 1, further comprising a dummy pattern formed around the antenna pattern.

11. The film antenna according to claim 10, wherein the antenna pattern and the dummy pattern comprise a mesh structure.

12. A display device comprising the film antenna according to claim 1.

* * * * *